United States Patent [19]

Vidal et al.

[11] Patent Number: 5,316,736
[45] Date of Patent: May 31, 1994

[54] APPARATUS FOR REACTING A GAS AND A PARTICULATE MATERIAL IN AN ENCLOSURE, AND METHOD FOR OPERATING SAID APPARATUS

[75] Inventors: Jean Vidal, Ville D'Avray; Philippe Payen, La Celle St Cloud; Jean-Claude Semedard, Paris; Jean-Xavier Morin, Neuville Aux Bois, all of France

[73] Assignee: Stein Industrie, Velizy-Villacoublay, France

[21] Appl. No.: 778,089

[22] PCT Filed: Apr. 18, 1991

[86] PCT No.: PCT/FR91/00325
§ 371 Date: Dec. 12, 1991
§ 102(e) Date: Dec. 12, 1991

[87] PCT Pub. No.: WO91/16130
PCT Pub. Date: Oct. 31, 1991

[30] Foreign Application Priority Data
Apr. 20, 1990 [FR] France ................... 90 05060

[51] Int. Cl.⁵ ............................................. F27B 15/08
[52] U.S. Cl. ...................................... 422/145; 422/146; 422/147; 422/141; 110/245
[58] Field of Search .............. 422/145, 146, 141, 147; 432/58; 34/57 R, 57 A, 57 B, 57 E; 110/245

[56] References Cited

U.S. PATENT DOCUMENTS

| | | | |
|---|---|---|---|
| 2,779,777 | 1/1957 | Mungen | 422/141 |
| 4,165,717 | 8/1979 | Reh et al. | 122/4 D |
| 4,201,541 | 5/1980 | Schoppe | 432/58 |
| 4,308,806 | 1/1982 | Hemura | 110/245 |
| 4,474,119 | 10/1984 | Jones | 110/245 |
| 4,594,967 | 6/1986 | Wolowodiuk | 110/245 |
| 4,753,177 | 6/1988 | Engström et al. | 34/57 A |
| 4,788,919 | 12/1988 | Holm et al. | 110/245 |
| 4,940,007 | 7/1990 | Hiltunen et al. | 110/245 |
| 4,981,111 | 1/1991 | Bennett et al. | 110/245 |
| 5,014,652 | 5/1991 | Hyldgaard | 122/4 D |

*Primary Examiner*—Robert J. Warden
*Assistant Examiner*—Hien Tran
*Attorney, Agent, or Firm*—Sughrue, Mion, Zinn Macpeak & Seas

[57] ABSTRACT

The reactor includes: a lower zone (I) having a fast circulation fluidized bed; a zone having a dense fluidized bed (13) and located adjacent to the top of the lower zone, being separated therefrom by a dividing wall, the top layer of the dense bed receiving falling particulate materials, and its bottom layer returning these materials to the lower zone (I); and a higher zone having a fast circulation fluidized bed. The invention is applicable to boilers.

7 Claims, 8 Drawing Sheets

APPARATUS FOR REACTING A GAS AND A PARTICULATE MATERIAL IN AN ENCLOSURE, AND METHOD FOR OPERATING SAID APPARATUS

FIELD OF THE INVENTION

The present invention relates to apparatus for performing an exothermal or an endothermal reaction inside an enclosure (referred to below as a "reactor") between at least one gas and at least one particulate material, the apparatus comprising at least one means for introducing particulate material, at least one means for introducing reaction and fluidization gas, with the respective introduced flow rates of the particulate material and of the fluidization gas being such that they enable a fast upward flow of gas and particulate material to be established within fast circulating fluidized bed zones, means for directing a mixture of the reaction gas and the particulate material reaching the top of the reactor into a separator, means for exhausting the gas produced by the reaction, and means for recycling the particulate material from the separator to the bottom of the reactor.

BACKGROUND OF THE INVENTION

There are essentially two groups of known similar techniques for performing chemical reactions in a fluidized bed.

A first group uses a dense fluidized bed [also called a "bubbling" bed] characterized by the existence of two zones having distinct particle concentrations within the reaction enclosure, with particle concentration being high in a first zone, e.g. 1,000 kg/m$^3$ for a combustion fluidized bed, and much lower, less than 1 kg/m$^3$ in a second zone above the first and separated therefrom by a relatively well-defined surface. The velocity difference between the gases and the solid particles is not large. In combustion reactors, combustion efficiencies are low, e.g. 85% to 95%, and the rates at which sulfur oxides and nitrogen oxides are rejected are significant, thereby limiting this technique to small plants.

Within this first group of techniques, a proposal has been made in patent document GB-A-No. 1 412 033 to split up a dense fluidized bed combustion reactor by means of an annular dividing wall, with the lower edge of the dividing wall being spaced apart from the fluidization grid, thereby obtaining a central dense bed region in which combustion takes place, and an annular dense bed region in which solid particles flow downwards, solely for the purpose of exchanging heat with a jacket surrounding the reactor. Some of the solid particles in the central dense bed region overflow the top of the annular dividing wall and move down in the annular dense bed region to return to the central combustion zone beneath the lower edge of the annular dividing wall. This type of apparatus suffers from the above-mentioned drawbacks of dense fluidized bed reactors, mainly the existence of a reaction zone having a very low concentration of particles above the dense bed. Further, it recirculates particulate matter taken solely from the upper part of the dense fluidized zone in the same manner as would a cyclone if located at the outlet from a circulating fluidized bed of the type described below.

A second group of known techniques makes use of a "circulating" fluidized bed of a type described in an article by REH published in the journal Chemical Engineering Progress, February 1971. This is described, in particular, in French Pat. Nos. 2 323 101 and 2 353 332 (Metallgesellschaft) [corresponding to U.S. Pat. No. 4,165,717]. It differs from the first group in particular by the lack of any separation surface between two zones and by the existence of a uniform reaction temperature throughout the reactor. The concentration or suspension density of particulate material varies substantially continuously from the bottom to the top of the reactor body, and the difference between the velocities of the gases and of the solid particles is much higher. For combustion reactors, combustion efficiencies are improved and the rates at which sulfur oxides and nitrogen oxides are rejected are lower. This technique is suitable for application to large plants, but it nevertheless suffers from drawbacks.

These may be observed, in particular, when the reaction is a combustion reaction. It is observed that the circulating fluidized bed reactor may be described as follows:

a) a higher zone of larger volume having a varying concentration of solid particles that is limited, but nevertheless sufficient. Heat exchange takes place in this higher zone, and in general it has tubes occupying the empty space in the reactor or it has walls lined with tubes through which a reactor cooling fluid passes. The concentration of particles varies from the bottom to the top of this zone, from about 50 kg/m$^3$ to about 10 kg/m$^3$, for example, and the figures may sometimes be even lower. In practice, the concentrations of particles provide heat exchange with the tubes lining the walls. The velocity of the gases is at full load is generally limited to values in the range 4 meters per second (m/s) to 6 m/s in order to avoid any risk of erosion; and b) a lower zone of smaller volume having a much higher concentration of particles, varying from bottom to top, for example, from 500 kg/m$^3$ to 50 kg/m$^3$, i.e. in a ratio of 10:1, which ratio may even exceed 20:1 if the reactor is operating at half load, i.e. with the fluidization gas flowing at half velocity. This lower zone is where combustion takes place. A portion of the gas required for combustion, generally referred to as "primary" gas, is blown therein through a fluidization grid located at the bottom of the reactor. The major portion of the remainder of the combustion gas, called "secondary" gas, is injected at various levels above said grid, and the use of these levels may vary depending on the load in the reactor (with some of the levels being unused when the reactor is at partial load).

The velocity of the combustion flue gases in this lower zone of the reactor is determined by its varying section and by staged addition of secondary gas, and the desired velocity is practically the same as in the higher zone. This produces the large variation in concentration across the combustion zone which gives rise to several drawbacks:

incomplete combustion: concentration of unburnt particles and carbon monoxide may be high at the outlet of the reactor especially with some fuels that are difficult to burn;

desulfurization efficiency may be too low, thus requiring large quantities of desulfurization agent to be injected; and limited flexibility in response to variations in reactor load, due to the requirement to have a minimum gas velocity for maintaining appropriate fluidization conditions, said velocity being about 3 m/s.

In order to improve temperature and combustion uniformity, it is therefore often necessary to increase the quantity of particulate material in the reactor, thereby increasing the amount of energy needed for fluidization.

In order to reduce these drawbacks, secondary gas injection at various levels is often used, and the ratio of secondary gas flow rate to primary gas flow rate is varied as a function of reactor load. However, this ratio can be varied only to a limited extent, since other criteria have to be taken into account, restricting flexibility:

burnout rate, which requires the primary gas flow rate to be maintained above a minimum value;

the requirement to maintain a reducing atmosphere in the lower part of the combustion zone of the reactor in order to keep the production of nitrogen oxides down to a minimum; and the requirement to increase the excess of gas needed for combustion when the reactor load decreases in order to avoid excessively increasing the non-uniformity of particle concentration, while taking care to limit the production of nitrogen oxides as much as possible and to avoid significantly decreasing the thermal efficiency of the installation.

The wide range of said concentrations in the lower zone containing the combustion zone is thus a drawback and it would be advantageous to reach more uniform concentration between the various reactor levels which would not only improve combustion efficiency, but would also decrease fluidization energy consumption.

Figure 1:
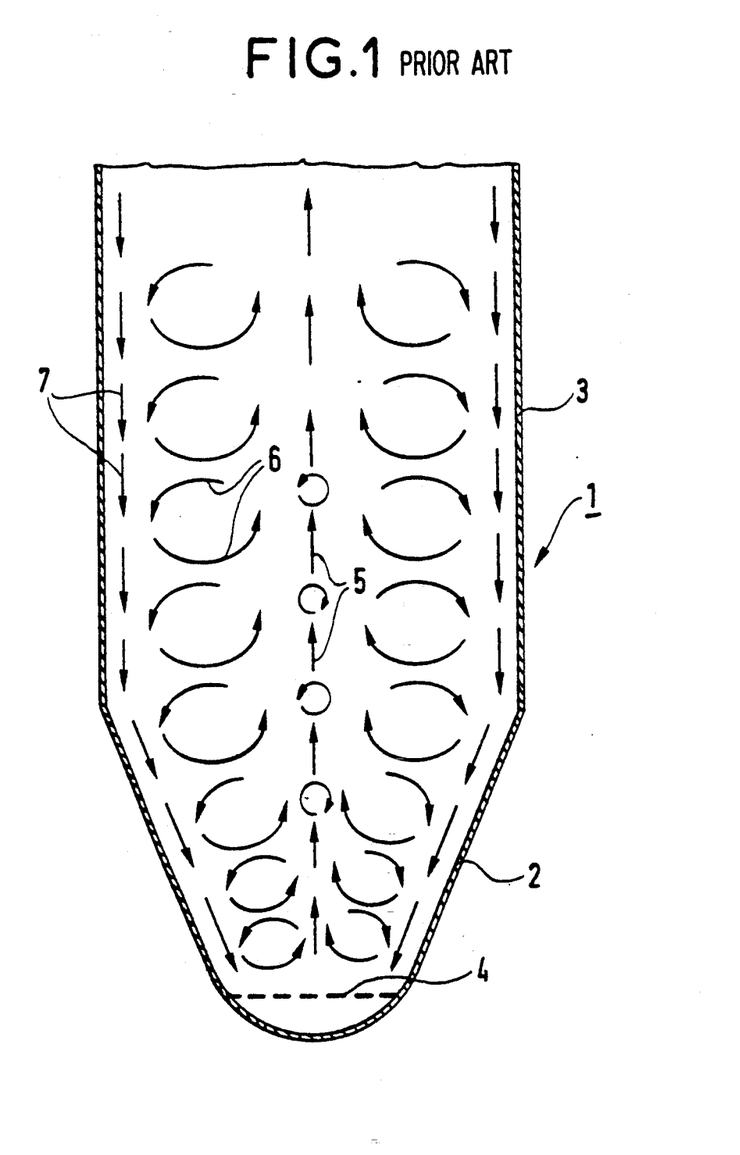
FIG. 1 is a diagram showing the flow of particulate materials in a prior art type of circulating fluidized bed reactor.

Unfortunately, a circulating fluidized bed cannot meet this requirement because of two special problems:

a) the velocity of the fluidzation gas in the combustion zone is related to the velocity selected in the higher zone where heat exchange occurs; and b) solid particles are moving both up and down as shown in diagrammatic FIG. 1, and many solid particles of small size never move down to the vicinity of the fluidization grid, thereby producing vertical particle size stratification inside the reactor and causing the lower zone of the reactor to operate with larger sized particles. For example, the solid concentration in the first meter above the fluidization grid comes close to that of a dense bed, which is costly in energy and of no use for combustion.

Within this technique, other patents have provided various improvements to the operation of the circulating fluidized bed:

U.S. Pat. No. 4,594,967 and European patent No. 0 332 360 provide for the installation of a dense fluidized bed for capturing material at the outlet from the circulating fluidized bed, the material captured in this way reducing the amount of material captured in a conventional cyclone situated downstream from the expansion chamber constituting a clearance zone situated above the dense bed.

In these patents:

the dense fluidized bed is situated at the outlet from the circulating fluidized bed either on one side thereof U.S. Pat. No. 4,594,967 and patent EP 0 332 360 for a reactor that is rectangular in horizontal section), or else directly above it (EP patent No. 0 332 360 for a reactor that is circular in horizontal section);

the cyclone is situated either directly downstream from the expansion chamber (EP patent No. 0 332 360) or else after a tubular enclosure fitted with heat exchangers for reducing the temperature of the gases (U.S. Pat. No. 4,594,967) and therefore not forming a part of the circulating fluidized bed of the patent; in all of these cases the material taken by the dense fluidized bed reduces the material collected in the cyclone and does not alter the maximum quantity of material recycled in the circulating fludized bed; and in both of those patents, the expansion chamber situated downstream from the zone containing the dense fluidized bed that does not have all of the fundamental characteristics of a circulating bed (uniform temperature, rising gas speed, solid matter concentration) that enable said zone to be used for transferring heat from the gas-solid mixture to the walls while retaining uniform temperature and gas-solid mixing good for containing chemical reactions.

Another patent, U.S. Pat. No. 4 788 919 provides for subdividing a single chamber into three, two, or one, with the boundaries between each of these chambers being provided by means of an expansion chamber whose section, as mentioned, may be four times that of the reactor, such that the gas velocity therein is no longer that of a circulating fluidized bed reactor. This velocity reduction makes it possible for material to be captured in the dense fluidized beds, thus greatly reducing the concentration of material in the or both the other upper chambers such that circulating fluidized bed operation takes place only in the bottom chamber, with the other two chambers and their extensions serving to capture additional small quantities of material and to provide additional cooling which leads the author of that patent to favor the design with one chamber only, thus reducing that patent to a disposition similar to that of Patents U.S. Pat. No. 4 594 967 and EP Pat. No. 0 332 360, i.e. to installing a dense fluidized bed at the outlet from a circulating fluidized bed reactor. In any event, in a design having a plurality of chambers, the same gas velocity is maintained therein.

In conclusion, these patents provide changes in the prior circulating fluidized bed type technique whose drawbacks are specified above.

Compared with said technique they are characterized by a reduction in the amount of solid material captured by the cyclones or separators, but they do not alter the pressure and concentration profile characteristics of the prior "circulating fluidized bed" technique.

SUMMARY OF THE INVENTION

An object of the present invention is to provide apparatus for obtaining a reaction in an enclosure between a gas and a particulate material, the apparatus including a new fluidized bed disposition offering greater uniformity in the concentration of solid particles in the lower zone with a moderate concentration of solid particles in said zone which optionally constitutes a combustion zone, and with a relatively high fluidization gas flow velocity through said lower zone.

In the apparatus of the invention the reactor is divided into three zones:

a) a lower zone operating under fast fluidized bed conditions with a mean upward velocity of the fluidization gas under empty conditions and at full load in the range 4.8 m/s to 12 m/s, the height of said zone being such that the gas residence time through said lower zone lies in the range 0.25 seconds to 4 seconds;

b) a higher zone of section $S_2$ operating under fast fluidized bed conditions, with an upward velocity $V$ of the fluidization gas under empty conditions and at full load in the range 4 m/s to 10 m/s, the ratio of said velocity to the velocity of the fluidization gas in said lower zone being in the range ½ to 1/1.2, the height of said zone being such that the residence time of the fluidization gas in said zone at full load lies in the range 2 seconds to 10 seconds, and the concentration P at the top of the higher zone of the reactor is not less than 2 kg/m$^3$; and c) a zone operating under dense fluidized bed conditions with the gas flowing upwards under empty conditions and at full load at a velocity in the range 0.3 m/s to 2.5 m/s, said zone being adjacent to the top of said lower zone operating under fast fluidized bed conditions and being separated therefrom by a dividing wall, and being disposed in such a manner as to receive both particulate material coming upwards from the adjacent top of said lower zone, and particulate material falling down from said higher zone along at least one of its walls;

the apparatus further including at least one means for reinjecting particulate material from said dense fluidized bed zone to the bottom of said lower zone operating under fast fluidized bed conditions, the rate at which particulate material is re-injected from said zone operating under dense fluidized bed conditions being greater than the quantity:

$$q = P \times V \times S_2.$$

Figure 7:
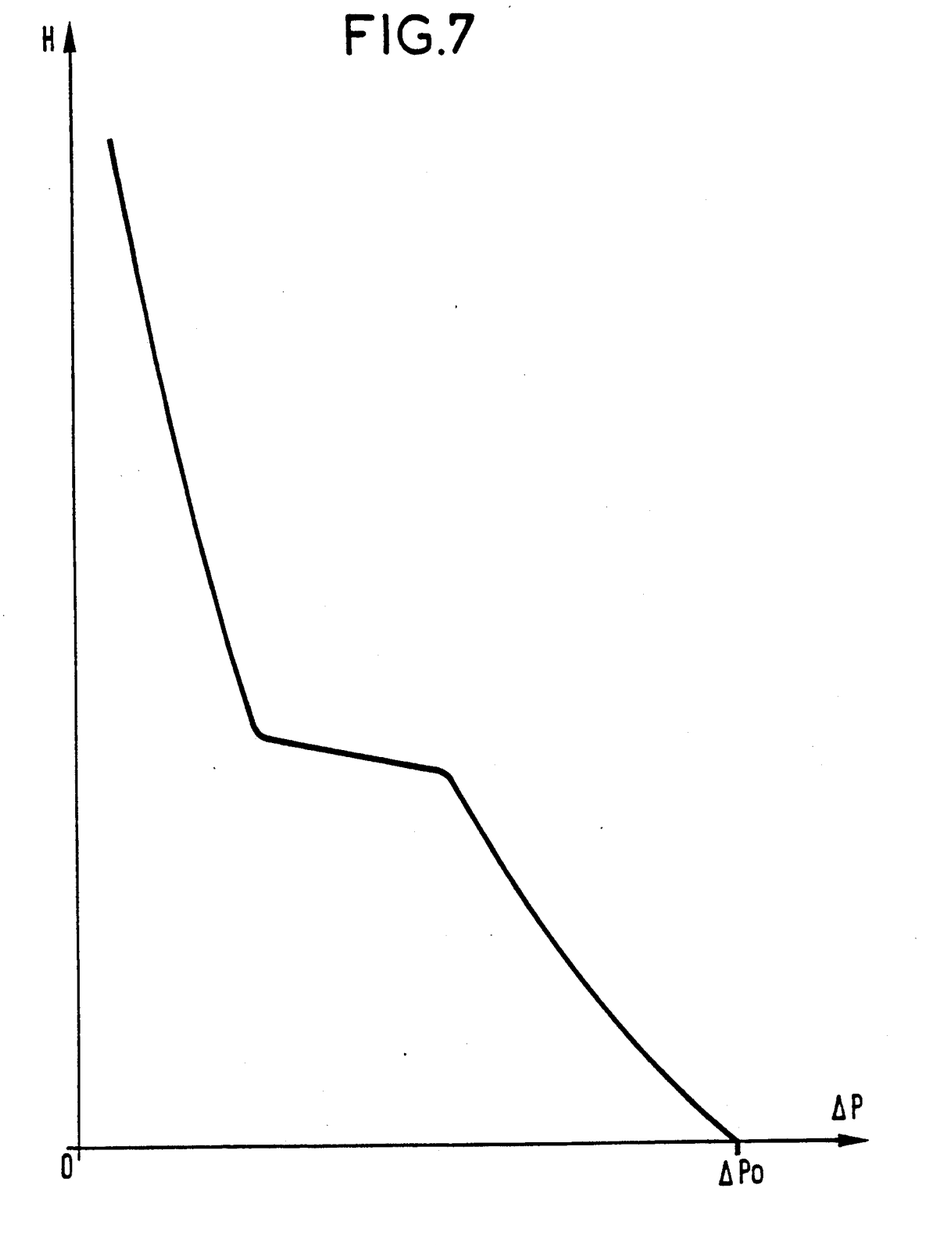
FIG. 7 is a graph showing pressure as a function of height in apparatus of the invention.

In such apparatus, the pressure profile up the height of the circulating fluidized bed zones (higher zones and lower zone) is as indicated in the graph of FIG. 7. The particle concentration as deduced from the slope at any point on the profile has a region of discontinuity on either side of the overflow from the dense fluidized bed, and this is characteristic of the apparatus.

By virtue of this disposition, the following are obtained:

more uniform temperature distribution inside the reactor with a decreased risk of solid particles agglomerating;

in combustion reactors, combustion is improved by a decrease in the formation of carbon monoxide and unburnt particles, particularly with fuels that are difficult to burn: e.g. anthracites and coals having low volatile matter content; and improved reactor flexibility by decreasing the minimum allowable load, this being made possible by a high ratio between the gas velocity at full load in the lower zone and the minimum velocity required for maintaining satisfactory fluidization conditions.

The invention also extends to the application of the above-defined apparatus to the combustion of substances containing carbon.

Powdered coal burning apparatuses of the invention are described below by way of example and with reference to the diagrammatic figures of the accompanying drawings.

DESCRIPTION OF THE PRIOR ART

In FIG. 1 which shows conventional operation of a circulating bed, the reactor 1 includes a flared lower zone 2 and a higher zone 3 of rectangular section. Solid particles rise above the fluidization grid 4 towards the top of the reactor as shown by arrows 5. These particles tend to move off towards the walls and to fall down again. However, some of the finer particles are re-entrained upwards by turbulent motion as shown at 6. Other particles move towards the wall and flow down it as shown by arrows 7.

DESCRIPTION OF THE PREFERRED EMBODIMENTS

Figure 2:
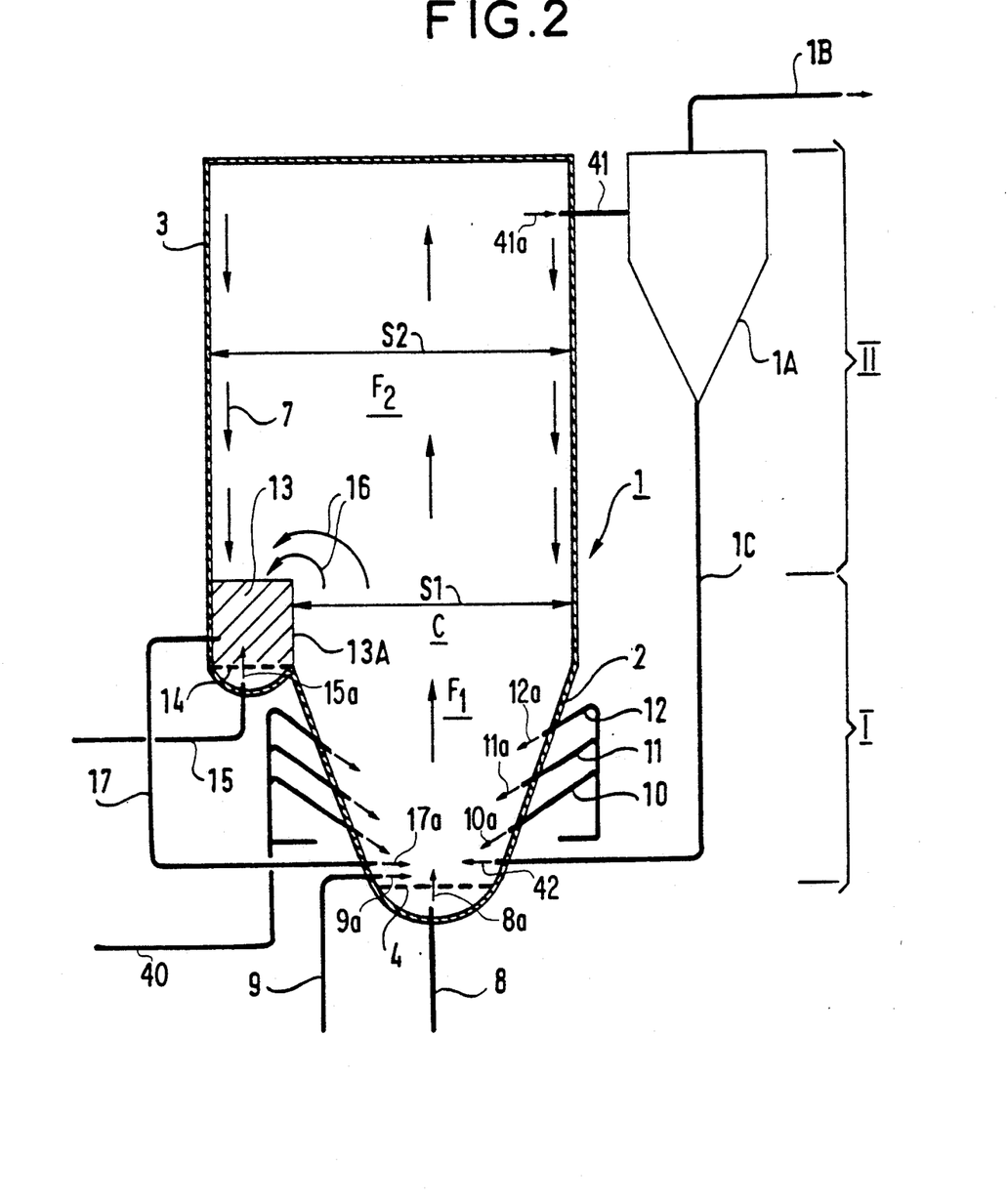
FIG. 2 shows apparatus in accordance with the invention having circulating fluidized beds and an intermediate dense fluidized bed.

In apparatus of the invention as shown in FIG. 2 with same numerals employed for elements which are the same as in FIG. 1, a fast flow fluidized bed $F_1$ is set up in the flared portion 2 of lower zone over the fluidization grid 4. A primary fluidization gas as per arrow 8a as delivered by a duct 8 is injected through this grid, said gas being constituted by air, possibly mixed with flue gas. Fuel as per arrow 9a in powder form, e.g. a suspension in air of coal dust, is also injected via a duct 9 immediately above the grid. A secondary gas from a secondary gas supply duct 40, also mainly constituted by air, with or without flue gas, is injected into the lower zone I of the reactor at three of successive levels via branch ducts or nozzles as depicted by arrows $10_a$, $11_a$ and $12_a$, respectively 10, 11, and 12. The fluidization gas velocity under empty conditions and at full load may vary from about 4.8 m/s to about 12 m/s, with the residence time of the gases under full load varying from 0.25 seconds to 4 seconds.

The secondary gas is injected in such a manner as to ensure that the atmosphere in the bottom of the lower zone I is a reducing atmosphere.

Above this flared lower part 2, a second fast circulation fluidized bed $F_2$ is established in a zone II, with the velocity of the fluidization gas under empty conditions and at full load varying in the range 4 m/s to 10 m/s, and with the residence time thereof varying in the range 2 seconds to 10 seconds.

In conventional manner, flue gas mixed with solid particles as per arrow 41a taken from the reactor outlet duct 41 enters a separation cyclone 1A from which the dust-free flue gas is removed by a duct 1B and the captured solid particles as per arrow 42 are recycled through the bottom of the reactor by a duct 1C.

Further, a dense fluidized bed 13A (represented by shading) is established at the exit from the combustion zone C having a section tail area $S_1$, and above a fluidization grid 14 through which an auxiliary fluidization gas as per arrow 15a is injected from a duct 15. The velocity of this gas through the dense bed 13A under empty conditions and at full load may vary in the range 0.3 m/s to 2.5 m/s. In most cases, little residual combustion takes place in this dense bed, since it is located at the outlet from the combustion zone C of the fast circulating bed $F_1$, and the residual carbon content of the particles is already very low. Should considerable combustion take place in the dense fluidized bed 13A, e.g. because of poor quality fuel, either flue gas could be injected into the injection nozzles beneath the grid of this dense bed 13A so as to decrease the oxygen content in the bed, or else, on the contrary, the oxygen content in this zone may be increased to increase combustion, in which case it may be necessary to have heat exchange tubes in the bed.

According to the invention, the height of such a dense fluidized bed 13A is preferably relatively low, generally less than 1.5 m. However, its height may be increased to about 3 m to about 4 m if it is desired to install a heat exchanger therein.

An essential function of this dense fluidized bed 13A is to capture a fraction of the solid particles falling down from the heat exchange zone located above the dense fluidized bed (arrows 7), and also to capture a fraction of the solid particles rising from the lower zone I of the reactor, located lower than the dense bed 13A (arrows 16). This capture of particles coming form the lower zone I of the reactor is due to the reduction in the velocity of the gas on entering the higher zone of the reactor. Nevertheless, it should be observed that unlike other methods, and except within the dense fluidized beds, gas velocity does not drop anywhere inside the reactor to below a value corresponding to operation under circulating fluidized bed conditions.

The solid particles captured by the dense fluidized bed 13A are conveyed by ducts 17 to the bottom of the reactor, as per arrow 17a immediately above the grid 4. These ducts may include respective siphon seals fed with fluidization gas at their bottoms. As a result, many small size solid particles are returned to the bottom of the reactor to which they would never have descended in a prior apparatus. The concentration or suspension density of particles of this size in the combustion zone C of the reactor is thus greatly increased, particularly in its higher region close to the level of the dense bed 13A. In addition, merely because of the change in section due to the presence of the dense bed 13A, the gas velocity in the lower zone I portion 2 of the reactor is higher than the gas velocity in the higher zone II portion 3 above the level of the dense bed 13A.

This velocity increase naturally provides better uniformity in the concentration of solid particles in the lower zone I of the reactor, thereby ensuring better combustion. The required value of the gas velocity in the combustion zone C may be obtained by selecting the section areas $S_1$ and $S_2$, with $S_1$ being the section area of the combustion zone at the level of the dense fluidized bed 13A, and $S_2$ being the section area of the higher zone portion 3 of the reactor, such that the section area of the dense fluidized bed 13 is then equal to the difference $S_2-S_1$. The flow rate of solid particles being recirculated by the ducts 17 also depends on this ratio of section areas, since the higher the velocity in the combustion zone C, the greater the flow rate of solid particles from the outlet of said zone, and the greater the flow rate of particulate materials captured by the dense fluidized bed 13A, since the quantity of particles falling down to the bottom of the zone II located above the dense bed 14A, 14B depends substantially on the section area $S_2$.

The selected section area $(S_2-S_1)$ for the dense bed 13 is thus an important criterion in designing the reactor of apparatus in accordance with the invention. By increasing the velocity of the gases and the concentration of particulate materials in the combustion zone, it determines to a large extent the improvement obtained in the uniformity of the solid concentration in the combustion zone, compared with the concentrations in a prior art fluidized bed.

Excellent results are obtained in practice for apparatuses for burning powdered coal by selecting the section ratio $S_2/S_1$ in the range 1.20 to 2.

Figure 3A:
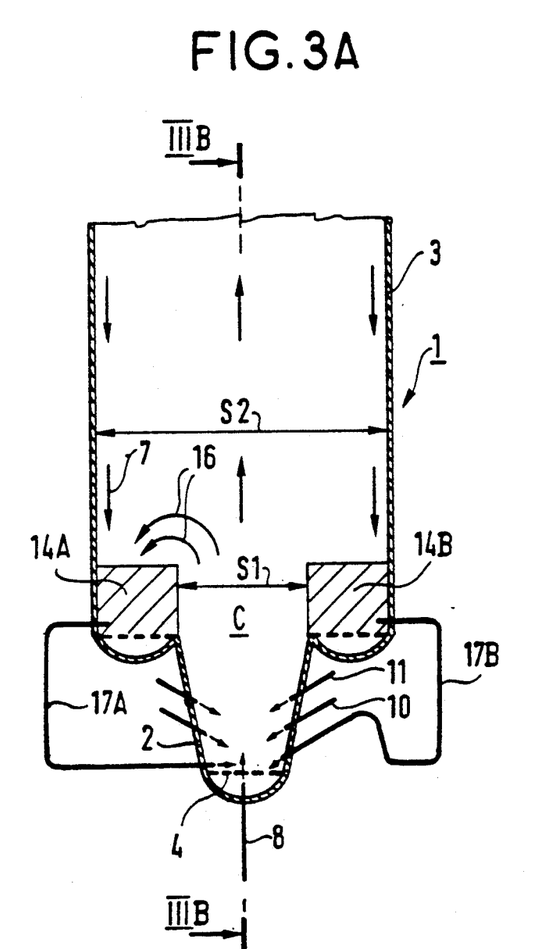
FIGS. 3A and 3B are two vertical sections at right angles to each other through the lower zone of a reactor having two lateral dense fluidized beds, with FIG. 3B being a section on line IIIB-IIIB of FIG. 3A.
Figure 3B:
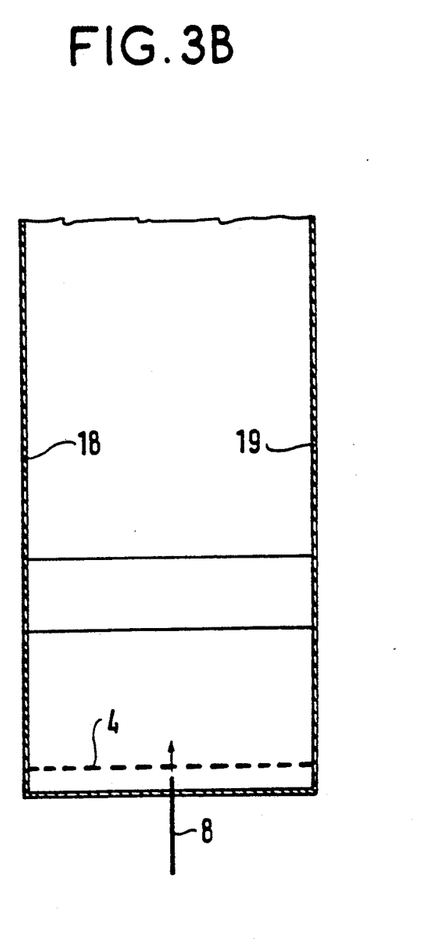

FIGS. 3A and 3B show the bottom of a reactor fitted with two dense fluidized beds 14A and 14B at an intermediate level, the beds being connected via respective recirculation ducts 17A and 17B to the bottom of the combustion zone, above the fluidization grid 4. By way of example, 17B is shown diagrammatically as a particle reinjection duct including a siphon seal fed with fluidization gas at the bottom of the siphon seal. A high ratio $S_2/S_1$ can thus more easily be obtained, with the difference $(S_2-S_1)$ being equal to the sum of the section areas of the two dense fluidized beds. This reactor does not include dense fluidized beds close to its lateral faces 18 and 19 perpendicular to the first faces, as shown in the section plane perpendicular to that of 3A (on line IIIB-IIIB).

Figure 4A:
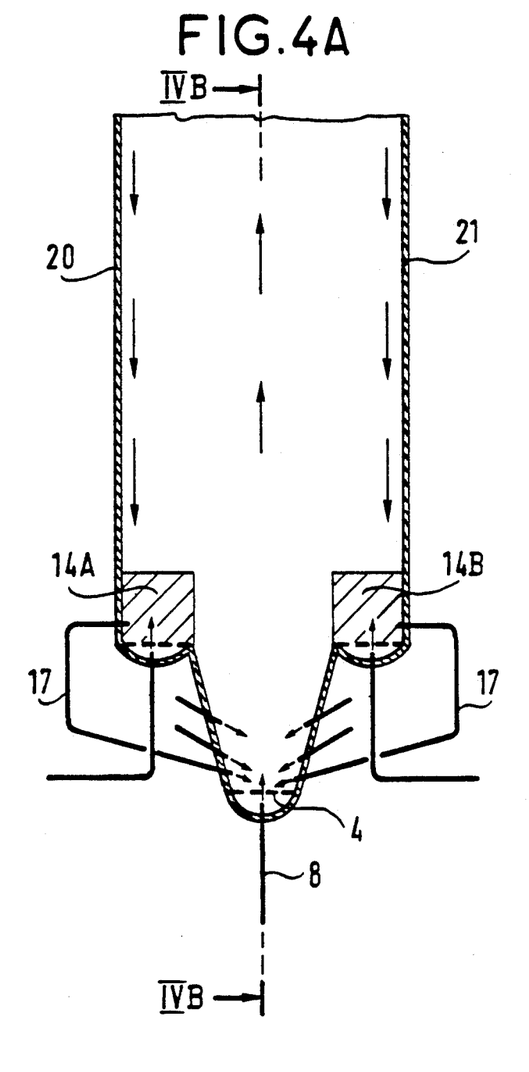
FIGS. 4A and 4B are two vertical sections at right angles to each other through the lower zone of a reactor having three dense fluidized beds, with FIG. 4B being a section on line IVB—IVB of FIG. 4A.
Figure 4B:
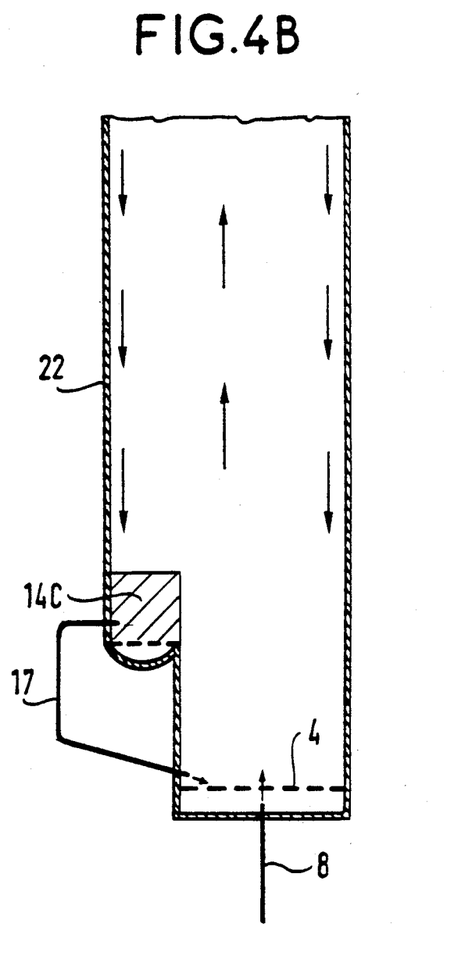

FIGS. 4A and 4B show the bottom of a reactor having three dense fluidized beds, two of them, 14A and 14B, beneath the walls 20 and 21 of FIG. 4A, and a third, 14C, beneath the wall 22 perpendicular to the first walls in the section plane perpendicular to that of FIG. 4A (line IVB—IVB in said figure).

Figure 5A:
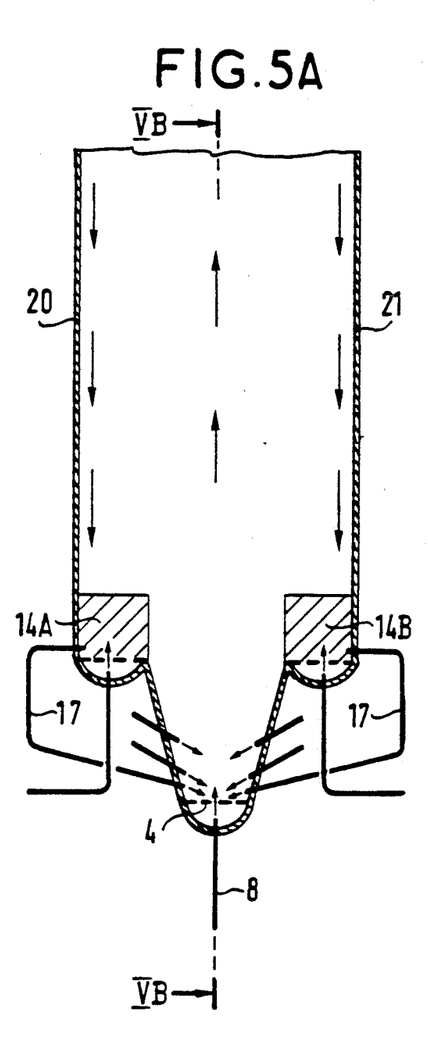
FIGS. 5A and 5B are two vertical sections at right angles to each other through the lower zone of a reactor having four dense fluidized beds, FIG. 5B being a section on line VB—VB of FIG. 5A.
Figure 5B:
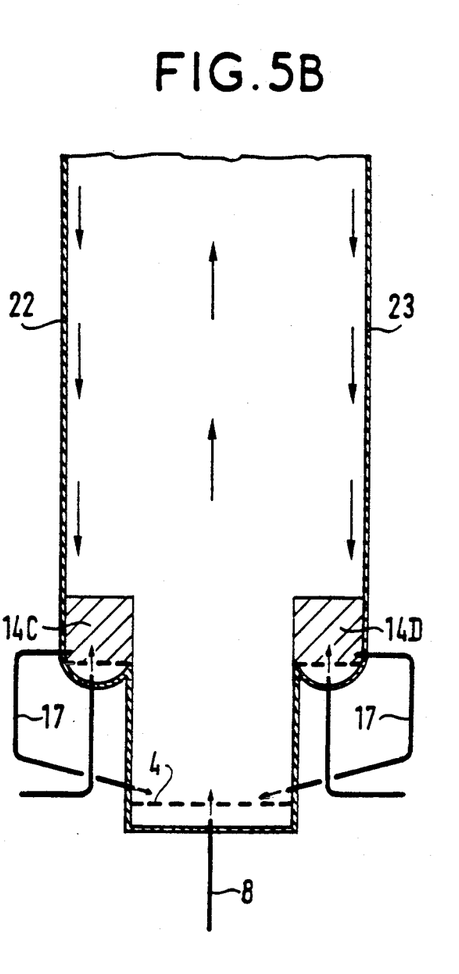

FIGS. 5A and 5B show the bottom of a reactor having four dense fluidized beds, two of them 14A and 14B being beneath the walls 20 and 21, and the other two 14C and 14D being beneath the perpendicular walls 22 and 23.

Figure 6A:
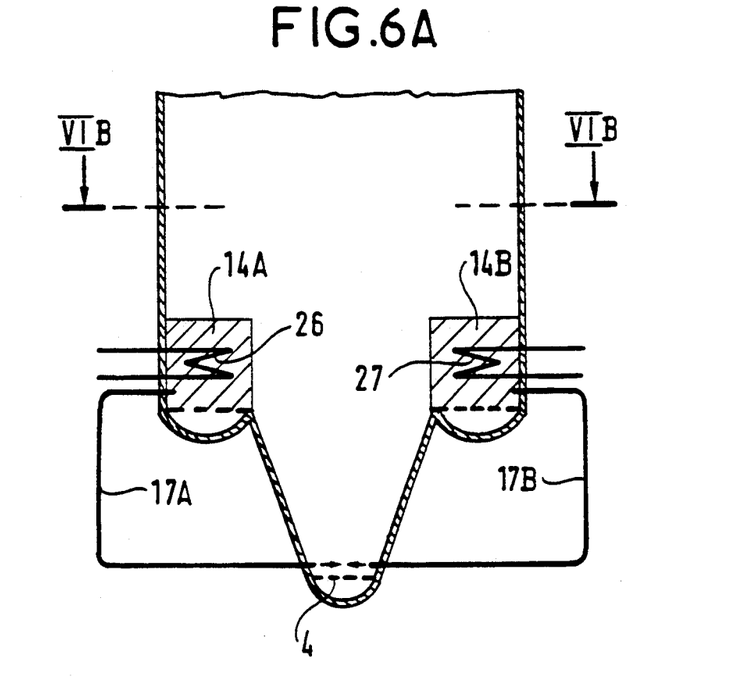
FIGS. 6A, 6B, and 6C show the layout of heat exchange surfaces in the two dense beds of a reactor, FIGS. 6B and 6C being two variants of a section on line VIB—VIB of FIG. 6A.

FIG. 6A is a diagram showing heat exchange surfaces in the dense fluidized beds. Heat exchange tubes are represented by coils 26 and 27. They extend over nearly the full height of the dense fluidized beds.

Figure 6B:
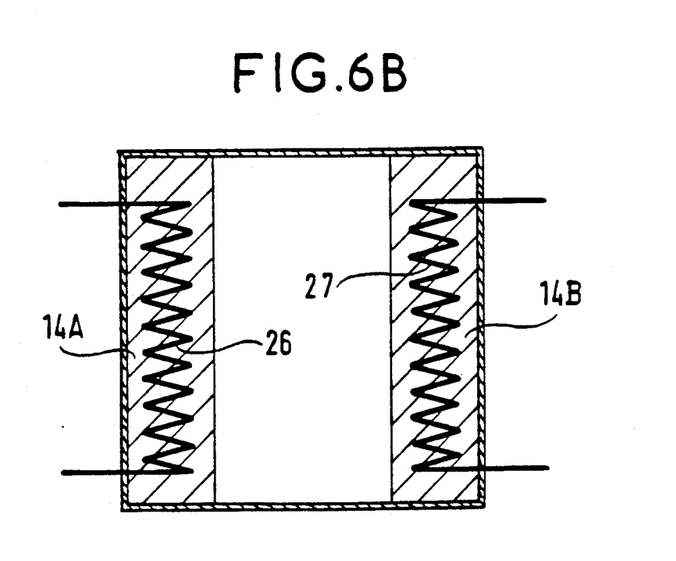

FIG. 6B shows a variant of the disposition of heat exchangers in the dense fluidized beds of FIG. 6A, the variant being shown in section on line VIB—VIB of FIG. 6A. Such heat exchangers occupy the major portion of the length of the dense fluidized beds.

Figure 6C:
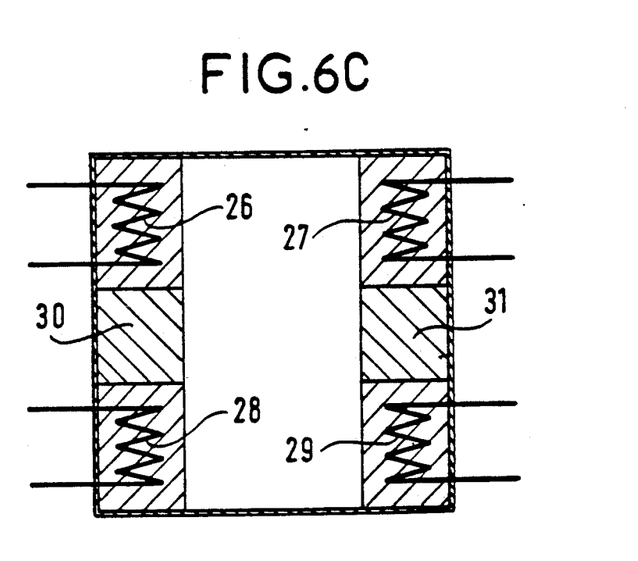

FIG. 6C shows a second variant of the FIG. 6A arrangement of exchangers in the dense fluidized beds, FIG. 6C being a section on line VIB—VIB of FIG. 6A. In this second variant, the two dense beds are both divided into three respective separate compartments. The end compartments thereof are occupied by heat exchangers such as 26, 28 or 27, 29 while the middle compartments 30, 31 are not occupied by heat exchange tubes.

All of the compartments 26, 27, 28, 29, 30, and 31 are connected by re-injection means 17 to the bottom of the reactor, with each compartment having its own reinjection means. The re-injection means of the compartments 30 and 31 are not provided with flow rate control means.

All of the dense fluidized beds as shown in FIGS. 3 to 5 are in operation when the reactor is at full load and they participate in cooling the reactor. At intermediate loads, cooling can be controlled in various ways (modulating or stopping fluidization, controlling the rate at which particles are re-injected into the bottom of the lower part) so as to maintain an optimum temperature close to 850° C. in the reactor, thus ensuring better desulfurization efficiency. When the load in the reactor decreases, the temperature in the reactor also decreases because the cooling surface area becomes too large. By modulating or switching off heat exchange in some of the dense bed compartments, it is possible to decrease reactor cooling, thus making it possible to maintain an optimum combustion temperature over a wider range of reactor loads, thereby maintaining the desulfurization rate at a high level.

Unlike prior art circulating fluidized bed reactors, it can be seen from FIG. 2 in particular that under the effect of two factors (particulate materials being recycled to the bottom of the reactor, and high velocity in the combustion zone), apparatus of the invention is capable of providing decoupling between the higher zone where the walls are constituted by heat-exchange tubes where gas velocity is selected to be optimum for obtaining good heat exchange without eroding the heat exchange tubes, and the lower combustion zone where a higher gas velocity is selected and where a more uniform concentration of particulate materials is ensured than in prior art circulating fluidized beds. For example, if a velocity of 6 m/s is required in the higher zone of the reactor, the lower zone thereof may be operated at a velocity in the range 7.2 m/s to 12 m/s.

Although the means for obtaining a reaction between a gas and a particulate material as described above with reference to the figures relate to apparatus for burning carbon-containing substances, with the reactor being cooled by having the walls of its higher zone constituted by or lined with heat exchange tubes, it will be understood that the invention applies to exothermal reactions other than combustion, and even to endothermal reactions, such as the calcination of alumina for example, so long as it is desired to improve the uniformity of solid concentration in the lower zone of the reactor and to operate in said zone at high velocities which are not suitable for the higher zone thereof. With endothermal reactions, the higher zone is naturally not provided with heat exchange tubes in direct contact with the particles.

We claim:

1. In an apparatus for performing an exothermal or an endothermal reaction comprising a reactor including an enclosure having a wall, a top and a bottom, said reaction being between at least one gas and at least one particulate material and said apparatus further comprising at least one means for introducing particulate material and at least one means for introducing fluidization gas into said reactor enclosure having respective introduced flow rates of said particulate material and said fluidization gas with said gas velocity being higher than the velocity of the particulate material, 4 to 12 m/sec thereby establishing a fast upward flow of gas and particulate material inside the reactor enclosure and defining a fast fluidized bed, means for directing a mixture of the reaction gas and the particulate material reaching the top of the reactor enclosure into a separator, means for exhausting the gas produced by the reactor, and means for recycling the particulate material from the separator to the bottom of the reactor enclosure, and wherein the reactor comprises:

a) a lower zone (I) having a top and a bottom comprising a fast fluidized bed $F_1$ with a mean upward gas velocity $V_1$ under empty conditions and at full load in a range of 4.8 m/s to 12 m/s and said fluidized bed $F_1$ having a height such that a gas residence time through said lower zone (I) lies in a range of 0.25 seconds to 4 seconds;

b) a higher zone (II) having a top and a bottom and being above said lower zone (I) and of a cross section $S_2$;

c) mean for flowing an additional fluidization gas upwards within said enclosure with a velocity in the range of 0.3 m/s to 2.5 m/s under empty conditions and at full load, defining a dense fluidized bed adjacent to the top of said lower zone (I) and being laterally separated therefrom and being disposed adjacent to at least a part of said wall of said reactor enclosure and receiving both particulate material coming upwards from the top of the lower zone, adjacent thereto, and particulate material falling down from said higher zone (I) along said part of said wall thereof; and d) at least one means for reinjecting particulate material from said dense fluidized bed, at a dense fluidized bed zone, to the bottom of said lower zone (I); the improvement comprising: said higher zone (II) comprising a fast fluidized bed $F_2$ with an upward gas velocity $V_2$ of the fluidization gas under empty conditions and at full load being in a range of 4 m/s to 10 m/s, and having a ratio of said upward velocity $V_2$ to the velocity $V_1$ of the fluidization gas of fluidized bed $F_1$ in said lower zone being in a range of $\frac{1}{2}$ to 1/1.2, and said fluidized bed $F_2$ having a height of said higher zone (II) such that a residence time of the fluidization gas in said higher zone (II), at full load, lies in a range of 2 seconds to 10 seconds, and having a concentration P at the top of the higher zone (II) of the reactor enclosure of not less than 2 kg/m$^3$; and wherein a reinjection rate of said means for reinjecting particulate material from the dense fluidized bed zone is greater than the quantity $$q = P \times V_2 \times S_2,$$

and wherein a ratio ($S_2/S_1$) of said cross section $S_2$ to a cross section $S_1$ of the lower zone (I) at a level of the dense fluidized bed zone (13) lies in a range of 1.20 to 2.

2. Apparatus according to claim 1, wherein a plurality of dense fluidized beds are disposed substantially at a same level within said reactor, and angularly distributed around a central space of said enclosure.

3. Apparatus according to claim 1, further including heat exchange members in said dense fluidized bed zone for exchanging heat.

4. Apparatus according to claim 3, further including means for adjusting a temperature of the reactor by controlling fluidization velocity of said dense fluidized bed.

5. Apparatus according to claim 1, further including, in said wall of the reactor higher zone (II) proximate to said fast fluidized bed therein, means for exchanging heat.

6. Apparatus according to claim 1, wherein said means for introducing fluidization gas comprises at least one first nozzle for injecting said fluidization gas beneath a grid beneath said lower zone (I) and second nozzles for injecting said fluidization gas at different levels of said lower zone (I).

7. A method of performing an exothermal or an endothermal reaction inside a reactor between at least one reaction gas and at least one particulate material, the reactor comprising an enclosure having a wall, a top and a bottom, at least one means for introducing particulate material into the bottom of the reactor enclosure, at least one means for introducing a fluidization gas into the reactor enclosure at respective introduced flow rates of said particulate material and of said fluidization gas to establish a fast upward flow of gas and particulate material inside the reactor, means for directing a mixture of the fluidization gas and the particulate material reaching the top of the reactor enclosure into a separator, means for exhausting the gas produced by the reactor, and means for recycling the particulate material from the separator to the bottom of the reactor enclosure, said method comprising the following steps:

a) establishing in a lower zone (I) of the reactor a fast fluidized bed $F_1$ with a mean upward velocity $V_1$ of the fluidization gas under empty conditions and at full load in a range of 4.8 m/s to 12 m/s, and with a fluidized bed $F_1$ height of said zone such that a gas residence time through said lower zone lies in the range of 0.25 seconds to 4 seconds;

b) establishing in a higher zone (II) of a section $S_2$, a fast fluidized bed $F_2$, with an upward velocity $V_2$ of the fluidization gas under empty conditions and at full load in a range of 4 m/s to 10 m/s, with a ratio of said velocity $V_2$ of said fluidization gas in the higher zone (II) to the velocity $V_1$ of the fluidization gas in said lower zone (I) being in a range of $\frac{1}{2}$ to 1/1.2, with a height of said fluidized bed $F_2$ being such that a gas residence time of said higher zone (II) at full load lies in a range of 2 seconds to 10 seconds, and wherein a concentration P at a top of the higher zone (II) of the reactor is not less than 2 kg/m$^3$; and c) establishing in a dense fluidized bed zone, adjacent to a top of said lower zone (I), and separate therefrom, with a dense fluidized bed having an additional fluidization gas thereof flowing upwards at a velocity in a range of 0.3 m/s to 2.5 m/s under empty conditions and at full load, and with said zone being disposed adjacent to at least a part of said enclosure wall so as to receive both particulate material coming upwards from the top of said lower zone (I), adjacent thereto, and particulate material falling down from said higher zone (II) along at least said part of said enclosure wall; and d) reinjecting particulate material from said dense fluidized bed zone (13) to a bottom of said lower zone (I) at a reinjection rate which is greater than the quantity:

$q = P \times V_2 \times S_2.$

* * * * *